United States Patent
Kwok et al.

(10) Patent No.: US 12,471,162 B2
(45) Date of Patent: *Nov. 11, 2025

(54) BATTERY MANAGEMENT USING SELECTIVE EN-DC ENABLEMENT

(71) Applicant: T-Mobile USA, Inc., Bellevue, WA (US)

(72) Inventors: Ming Shan Kwok, Seattle, WA (US); Wafik Abdel Shahid, Kenmore, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 515 days.

This patent is subject to a terminal disclaimer.

(21) Appl. No.: 17/938,213

(22) Filed: Oct. 5, 2022

(65) Prior Publication Data

US 2023/0022863 A1 Jan. 26, 2023

Related U.S. Application Data

(63) Continuation of application No. 16/899,470, filed on Jun. 11, 2020, now Pat. No. 11,477,832.

(51) Int. Cl.
*H04W 76/15* (2018.01)
*H04W 52/02* (2009.01)
*H04W 88/06* (2009.01)

(52) U.S. Cl.
CPC ....... *H04W 76/15* (2018.02); *H04W 52/0229* (2013.01); *H04W 52/0251* (2013.01); *H04W 52/0261* (2013.01); *H04W 88/06* (2013.01)

(58) Field of Classification Search
CPC ..... H04W 72/51; H04W 48/18; H04W 48/20; H04W 52/18; H04W 36/08; H04W 36/22;
(Continued)

(56) References Cited

U.S. PATENT DOCUMENTS 6,668,028 B1 * 12/2003 Wieck .................... H04B 1/109
375/345
8,874,114 B2 10/2014 Suemitsu et al.
(Continued)

FOREIGN PATENT DOCUMENTS

CN 110291829 A 9/2019
CN 111866973 A 10/2020
(Continued)

OTHER PUBLICATIONS

Office Action for U.S. Appl. No. 16/899,470, mailed Apr. 14, 2022, Kwok, "Battery Management Using Selective EN-DC Enablement", 11 pages.
(Continued)

*Primary Examiner* — William D Cumming
(74) *Attorney, Agent, or Firm* — Lee & Hayes, P.C.

(57) ABSTRACT

A user equipment (UE) may support establishing an E-UTRAN New Radio-Dual Connectivity (EN-DC) connection with a telecommunication network that involves both a Long-Term Evolution (LTE) connection and a fifth generation (5G) connection. However, the EN-DC connection may drain a battery of the UE more quickly than the LTE connection would alone. Accordingly, an EN-DC switcher executing on the UE can determine when the UE should use the LTE connection alone or use the EN-DC connection, for example based on factors that may indicate when a user of the UE is less likely to perceive improved throughput or other benefits of the EN-DC connection.

20 Claims, 8 Drawing Sheets

(58) Field of Classification Search
CPC .. H04W 24/08; H04W 52/0238; H04W 76/30
USPC .......... 455/436, 438, 574; 375/345; 370/252
See application file for complete search history.

(56) References Cited

U.S. PATENT DOCUMENTS

| | | | |
|---|---|---|---|
| 9,084,169 B2* | 7/2015 | Cui ........................ H04W 48/18 |
| 9,271,236 B2* | 2/2016 | Drogi ................ H04W 52/0238 |
| 9,338,712 B2* | 5/2016 | Cui ........................ H04W 48/18 |
| 9,491,651 B2* | 11/2016 | Kazmi ...................... G01S 5/02 |
| 9,693,251 B2* | 6/2017 | Kazmi ................ H04B 17/309 |
| 9,750,021 B2 | 8/2017 | Fuse et al. |
| 9,794,884 B2* | 10/2017 | Drogi .................... H03F 1/0238 |
| 9,883,419 B2 | 1/2018 | Basu Mallick et al. |
| 9,921,631 B2* | 3/2018 | Piccolotto ................ G09G 3/20 |
| 10,085,188 B2 | 9/2018 | Centonza et al. |
| 10,149,170 B2 | 12/2018 | Youn et al. |
| 10,149,238 B2* | 12/2018 | Cui ........................ H04W 36/22 |
| 10,368,266 B2 | 7/2019 | Basu Mallick et al. |
| 10,531,388 B2 | 1/2020 | Kubota et al. |
| 10,560,959 B2* | 2/2020 | Kumar .................. H04W 72/21 |
| 10,568,149 B2* | 2/2020 | Youtz .................... H04W 76/30 |
| 10,757,617 B2 | 8/2020 | Tapsari et al. |
| 10,966,126 B2 | 3/2021 | Kim et al. |
| 11,057,795 B2 | 7/2021 | Liu et al. |
| 11,096,096 B1 | 8/2021 | Abdel Shahid et al. |
| 11,477,832 B2* | 10/2022 | Kwok .................... H04W 76/16 |
| 11,558,758 B2* | 1/2023 | Prabhakar ............. H04W 76/19 |
| 11,595,903 B2* | 2/2023 | Ahn .................. H04W 52/0264 |
| 11,758,420 B2* | 9/2023 | Prabhakar ............. H04W 76/16 370/328 |
| 11,895,583 B2* | 2/2024 | Yuan .................... H04W 76/16 |
| 12,022,493 B2* | 6/2024 | Chaudhary ......... H04L 65/1059 |
| 12,207,283 B2* | 1/2025 | Chaudhary ........... H04W 72/51 |
| 2014/0098691 A1* | 4/2014 | Kazmi .................. H04W 24/08 370/252 |
| 2014/0208145 A1* | 7/2014 | Piccolotto ................ G09G 3/20 713/324 |
| 2014/0274227 A1* | 9/2014 | Drogi ........................ H03F 3/24 455/574 |
| 2014/0335882 A1 | 11/2014 | Lee et al. |
| 2015/0087307 A1* | 3/2015 | Cui ........................ H04W 72/51 455/436 |
| 2015/0282025 A1* | 10/2015 | Cui ........................ H04W 48/20 455/438 |
| 2016/0165543 A1* | 6/2016 | Drogi ........................ H04B 1/04 455/574 |
| 2016/0234771 A1* | 8/2016 | Cui ........................ H04W 36/08 |
| 2016/0286449 A1 | 9/2016 | Choi et al. |
| 2017/0118269 A1 | 4/2017 | Park et al. |
| 2019/0029031 A1* | 1/2019 | Kumar .................. H04W 72/21 |
| 2019/0268950 A1* | 8/2019 | Youtz .................... H04W 76/30 |
| 2021/0045020 A1 | 2/2021 | Youtz et al. |
| 2021/0051767 A1 | 2/2021 | Zhang et al. |
| 2021/0105765 A1 | 4/2021 | Cirik et al. |
| 2021/0160945 A1 | 5/2021 | Abdel Shahid et al. |
| 2021/0185747 A1 | 6/2021 | Kanamarlapudi et al. |
| 2021/0195439 A1* | 6/2021 | Prabhakar ............. H04W 76/34 |
| 2021/0227431 A1 | 7/2021 | Kim et al. |
| 2021/0282127 A1* | 9/2021 | Chaudhary ......... H04W 52/027 |
| 2021/0392708 A1* | 12/2021 | Kwok .................... H04W 76/16 |
| 2022/0053426 A1* | 2/2022 | Ahn .................. H04W 52/0277 |
| 2022/0086689 A1 | 3/2022 | Abdel Shahid et al. |
| 2022/0159569 A1* | 5/2022 | Yuan .................... H04W 76/27 |
| 2022/0312524 A1* | 9/2022 | Bae ........................ H04W 76/27 |
| 2022/0394513 A1* | 12/2022 | Prabhakar ............. H04B 7/0834 |
| 2023/0022863 A1* | 1/2023 | Kwok .................... H04W 76/16 |
| 2023/0156115 A1* | 5/2023 | Kim .................. H04W 52/0254 455/550.1 |
| 2023/0209486 A1* | 6/2023 | Xing .................... H04W 72/232 370/350 |
| 2023/0276518 A1* | 8/2023 | Zhi ........................ H04W 76/30 370/329 |
| 2023/0421288 A1* | 12/2023 | Ren .................... H04W 52/0216 |
| 2024/0022926 A1* | 1/2024 | Prabhakar ............. H04W 76/30 |
| 2024/0137865 A1* | 4/2024 | Yuan .................... H04W 76/34 |
| 2024/0236851 A9* | 7/2024 | Yuan .................... H04W 52/027 |
| 2024/0306176 A1* | 9/2024 | Chaudhary ............. H04L 65/61 |

FOREIGN PATENT DOCUMENTS

| | | |
|---|---|---|
| WO | WO2008056426 A1 | 2/2010 |
| WO | WO2013191084 A1 | 12/2013 |
| WO | WO2014148874 A1 | 9/2014 |
| WO | WO2014163550 A1 | 10/2014 |
| WO | WO2015015298 A2 | 2/2015 |
| WO | WO2016013899 A1 | 1/2016 |
| WO | WO2021010881 | 1/2021 |

OTHER PUBLICATIONS

Office Action for U.S. Appl. No. 16/899,470, mailed Sep. 30, 2021, Kwok, "Battery Management Using Selective EN-DC Enablement", 10 pages.

* cited by examiner

BATTERY MANAGEMENT USING SELECTIVE EN-DC ENABLEMENT

CROSS REFERENCE TO RELATED APPLICATION

This application is a continuation of and claims priority to commonly assigned, co-pending U.S. patent application Ser. No. 16/899,470, filed Jun. 11, 2020. application Ser. No. 16/899,470 is fully incorporated herein by reference.

BACKGROUND

Dual connectivity arrangements can allow a user equipment (UE), such as a mobile phone, to wirelessly connect to different base stations of a telecommunication network simultaneously. In some examples, the base stations can use different radio access technologies.

For example, a UE can connect to one base station using a fifth generation New Radio (5G NR) connection and also connect to another base station using a Long-Term Evolution (LTE) connection. This type of dual connection can be referred to as an E-UTRAN New Radio-Dual Connectivity (EN-DC) connection. However, in some cases, the UE can use more energy to establish and/or maintain an EN-DC connection than the UE would use to establish and/or maintain an LTE connection alone.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Multiple radio access technology (RAT) Dual Connectivity (MR-DC) techniques have been developed that allow a UE to simultaneously use multiple types of radio access technologies to connect to a telecommunication network. For example, a radio access network (RAN) of the telecommunication network can include one or more base stations that use LTE radio access technologies, such as LTE evolved Node Bs (eNBs). The RAN of the telecommunication network can also include one or more base stations that use 5G NR radio access technologies, such as 5G gNBs. A UE that supports both LTE and 5G NR can use an E-UTRAN New Radio-Dual Connectivity (EN-DC) connection to wirelessly connect to both an LTE eNB and a 5G gNB. The UE can then send and/or receive data via one or both of the LTE connection and the 5G connection. The 5G connection alone, and/or in combination with the LTE connection, may have a higher throughput, better reliability, or other benefits relative to the LTE connection alone.

However, in some examples the UE may use more energy to establish and/or maintain an EN-DC connection that the UE would use to establish and/or maintain an LTE connection alone. Accordingly, an EN-DC connection may drain a battery of the UE more quickly than an LTE connection alone. In some examples, the benefits of the EN-DC connection, such as a higher throughput, relative to an LTE connection alone may be considered worth the higher battery drain rate. However, in situations in which the benefits of the EN-DC connection may be unlikely to be perceived by a user of the UE, battery life of the UE can be extended by disabling the EN-DC connection and instead using an LTE connection alone.

The systems and methods described herein can be used to select, at the UE, whether to use an EN-DC connection that includes both an LTE connection and a 5G connection, or to use the LTE connection alone. For example, in situations in which a user of the UE may be less likely to perceive the difference between using the EN-DC connection and using the LTE connection alone, the UE may determine to use the LTE connection alone in order to drain the battery of the UE more slowly. However, in other situations in which the user may be more likely to perceive an increased throughput or other benefits associated with the EN-DC connection, the UE may determine to use the EN-DC connection despite draining the battery of the UE more quickly.

Figure 1:
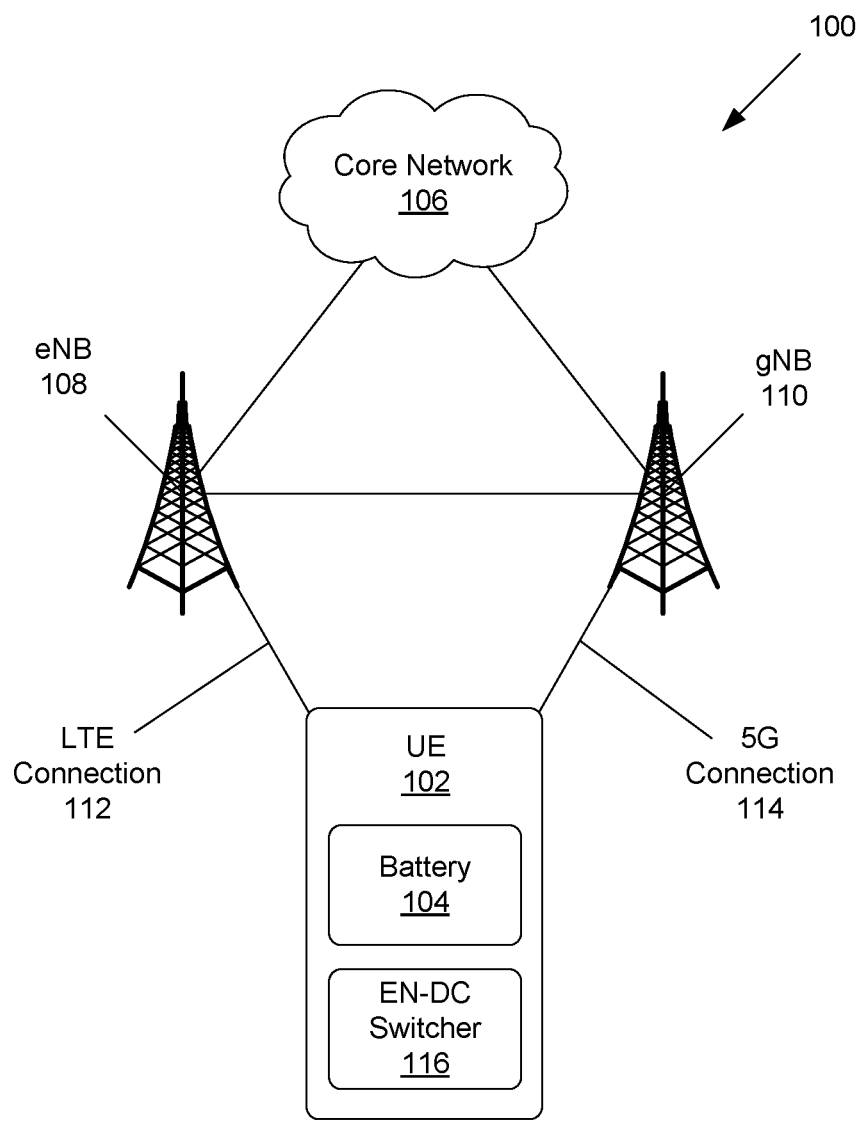
FIG. 1 shows an example network environment in which a UE can connect to a telecommunication network.

FIG. 1 shows an example network environment 100 in which a UE 102 can connect to a telecommunication network to engage in communication sessions for voice calls, video calls, messaging, data transfers, and/or any other type of communication. The UE 102 can be any device that can wirelessly connect to the telecommunication network. In some examples, the UE 102 can be a mobile phone, such as a smart phone or other cellular phone. In other examples, the UE 102 can be a personal digital assistant (PDA), a media player, a tablet computer, a gaming device, a smart watch, a hotspot, a personal computer (PC) such as a laptop, desktop, or workstation, or any other type of computing or communication device. Example architecture for the UE 102 is illustrated in greater detail in FIG. 2 and is described in detail below with reference to that figure.

The UE 102 can include a battery 104 that stores energy used to power the functions of the UE 102. The battery 104 can be a lithium-ion (Li-ion) battery, a lithium-ion polymer (LiPo) battery, a nickel cadmium (NiCd) battery, a nickel-metal hydride (NiMH) battery, or other type of battery. In some examples, the battery 104 can be rechargeable. For instance, the energy level of the battery 104 can increase when the UE 102 is connected to a wall outlet, a portable charger, or another external power source. However, operations of the UE 102 can also use energy and thus drain the battery 104 when the battery 104 is not charging.

The telecommunication network can have one or more access networks that include base stations and/or other access points, as well as a core network 106 linked to the access network. The access networks and/or the core network 106 can be compatible with one or more radio access technologies, wireless access technologies, protocols, and/or standards, such as 5G NR technology, LTE/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, WiFi® technology, and/or any other previous or future generation of radio access technology.

The UE 102 can wirelessly connect to one or more base stations or other access points of the access networks, and in turn be connected to the core network 106 via the base stations or other access points. In some examples, the core network 106 can be a packet core network of an LTE network, which may be referred to as an Evolved Packet Core (EPC). In other examples, the core network 106 can be a 5G core network.

The access networks can include an LTE access network known as an Evolved UMTS Terrestrial Radio Access Network (E-UTRAN). Base stations of the LTE access network can be known as eNBs, such as the eNB 108 shown in FIG. 1. The access networks can also include 5G access networks with base stations known as gNBs, such as the gNB 110 shown in FIG. 1. In some examples, the eNB 108 and the gNB 110 may be located at the same cell site. In other examples, the eNB 108 and the gNB 110 may be located at different cell sites.

One or both of the eNB 108 and the gNB 110 can be connected to the core network 106. For example, one or both of the eNB 108 and the gNB 110 may be connected to the core network 106 via 51 interfaces, or other interfaces, for transmission of user plane data and/or control plane data. The eNB 108 and the gNB 110 may also be connected to each other over an X2 interface, or other interface, for transmission of user plane data and/or control plane data.

The UE 102 and the telecommunication network can be configured to support dual connectivity between the UE 102 and multiple base stations in the access network. For example, the UE 102 can establish an LTE connection 112 with the eNB 108 and a 5G connection 114 with the gNB 110. The UE 102 can thus establish an EN-DC connection with the telecommunication network that uses both the LTE connection 112 and the 5G connection 114. However, as will be discussed below, when the UE 102 does not establish or maintain the EN-DC connection, the UE 102 may instead use the LTE connection 112 alone without the 5G connection 114.

An EN-DC connection that uses both the LTE connection 112 and the 5G connection 114 may be based on a 3GPP EN-DC configuration, such as an "option 3x" EN-DC configuration, "option 3" EN-DC configuration, "option 3a" EN-DC configuration, or other EN-DC configuration. In some of these examples, the eNB 108 can be a master node in the EN-DC configuration, while the gNB 110 can be a secondary node. In other examples, the gNB 110 can be the master node and the eNB 108 can be the secondary node. The master node may be configured to exchange control plane data with the core network 106, the UE 102, and with the secondary node. In some examples, the secondary node may not have direct interfaces for exchanging control plane data with the core network 106 and/or the UE 102, but may send and receive control plane data via the master node. In some examples, both the eNB 108 and the gNB 110 may be configured to directly exchange user plane data with the core network 106. In other examples, one of the eNB 108 and the gNB 110 may instead indirectly exchange user plane data with the core network 106 via the other one of the eNB 108 and the gNB 110.

When the UE 102 connects to the core network 106 via one or both of the eNB 108 and the gNB 110, one or more bearers can be established between the core network 106 and the UE 102. Bearers can be virtual channels used to transport data for the UE 102 between network elements. For example, an E-UTRAN Radio Access Bearer (E-RAB) can be established between a gateway of the core network 106 and the UE 102, with the E-RAB including an Si bearer between the gateway of the core network 106 and the eNB 108, and a data radio bearer between the eNB 108 and the UE 102. The LTE connection 112 can thus be associated with the data radio bearer between the eNB 108 and the UE 102. The 5G connection 114 can similarly be associated with a data radio bearer between the gNB 110 and the UE 102.

Multiple bearers can be set up between the network elements for different types of traffic for the UE 102. For example, the telecommunication network can set up a default bearer for general traffic associated with the UE 102, as well as dedicated bearers for traffic associated with specific services. For instance, a dedicated bearer can be set up for voice call data when the UE 102 is engaged in a voice call.

In some examples, a bearer between the core network 106 and the UE 102 can be established as a split bearer that passes through both the eNB 108 and the gNB 110 when an EN-DC connection has been established for the UE 102. For instance, a bearer can exist between the core network 106 and the eNB 108, and the bearer can split into two legs at the eNB 108. A first leg of the split bearer can be associated with the LTE connection 112 between the eNB 108 and the UE 102. A second leg of the split bearer may pass from the eNB 108 to the gNB and then to the UE 102, such that the second leg is associated with the 5G connection 114 between the gNB 110 and the UE 102. In other examples, the bearer may be established from the core network 106 to the gNB 110, where the bearer can be split into two legs associated with the LTE connection and the 5G connection. In still other examples, a first bearer can be established from the core network 106 to the eNB 108 and to the UE 102, while a separate second bearer can be established from the core network 106 to the gNB 110 and to the UE 102. In these examples, a portion of the first bearer can be associated with the LTE connection 112, while a portion of the second bearer can be associated with the 5G connection 114.

Establishing and using an EN-DC connection can provide benefits to the UE 102. For example, in some situations the 5G connection 114 can provide increased data throughput to and/or from the UE 102 when the 5G connection 114 is used alone or in combination with the LTE connection 112, relative to data throughput that can be achieved via the LTE connection 112 alone. However, in some situations the UE 102 may expend more energy when using an EN-DC connection than the UE 102 would expend when using the LTE connection 112 alone. Accordingly, the battery 104 of the UE 102 may drain more quickly when the UE 102 uses an EN-DC connection, relative to when the UE 102 uses the LTE connection 112 alone.

An entity, such as a manufacturer of the UE, an operator of the telecommunication network, or a user of the UE may consider the benefits of the EN-DC connection to be worth draining the battery 104 more quickly in some situations. For example, the entity may consider an increased data throughput level provided by the EN-DC connection to be an acceptable trade-off for the battery 104 draining more quickly, for instance if a user is streaming video or is downloading a large file via the UE 102. However, in other situations in which the user is less likely to perceive the benefits of the EN-DC connection, the entity may prefer that battery life be preserved. For instance, if a user is not actively using the UE 102, the faster drain rate of the battery 104 due to an EN-DC connection may be frustrating to the user.

Accordingly, the UE 102 can have an EN-DC switcher 116 that is configured to determine when the UE 102 should use the EN-DC connection and when the UE 102 should use the LTE connection 112 alone. The EN-DC switcher 116 can preserve battery life of the UE 102 in situations in which a user is unlikely to perceive benefits of the EN-DC connection, by causing the UE 102 to use the LTE connection 112 alone during such situations. Operations of the EN-DC switcher 116 are discussed in more detail below with respect to FIGS. 3-5.

In some examples, the EN-DC switcher 116 may be part of an operating system of the UE 102. In other examples, the EN-DC switcher 116 may be part of firmware for the UE 102 overall, or firmware for a modem, network adapter, or data transmission interface. In still other examples, the EN-DC switcher 116 can be an application that can be executed by the UE 102. The EN-DC switcher 116 may be provided and/or configured by a vendor or manufacturer of the UE 102, by an operator of the telecommunication network, or by any other entity.

Figure 2:
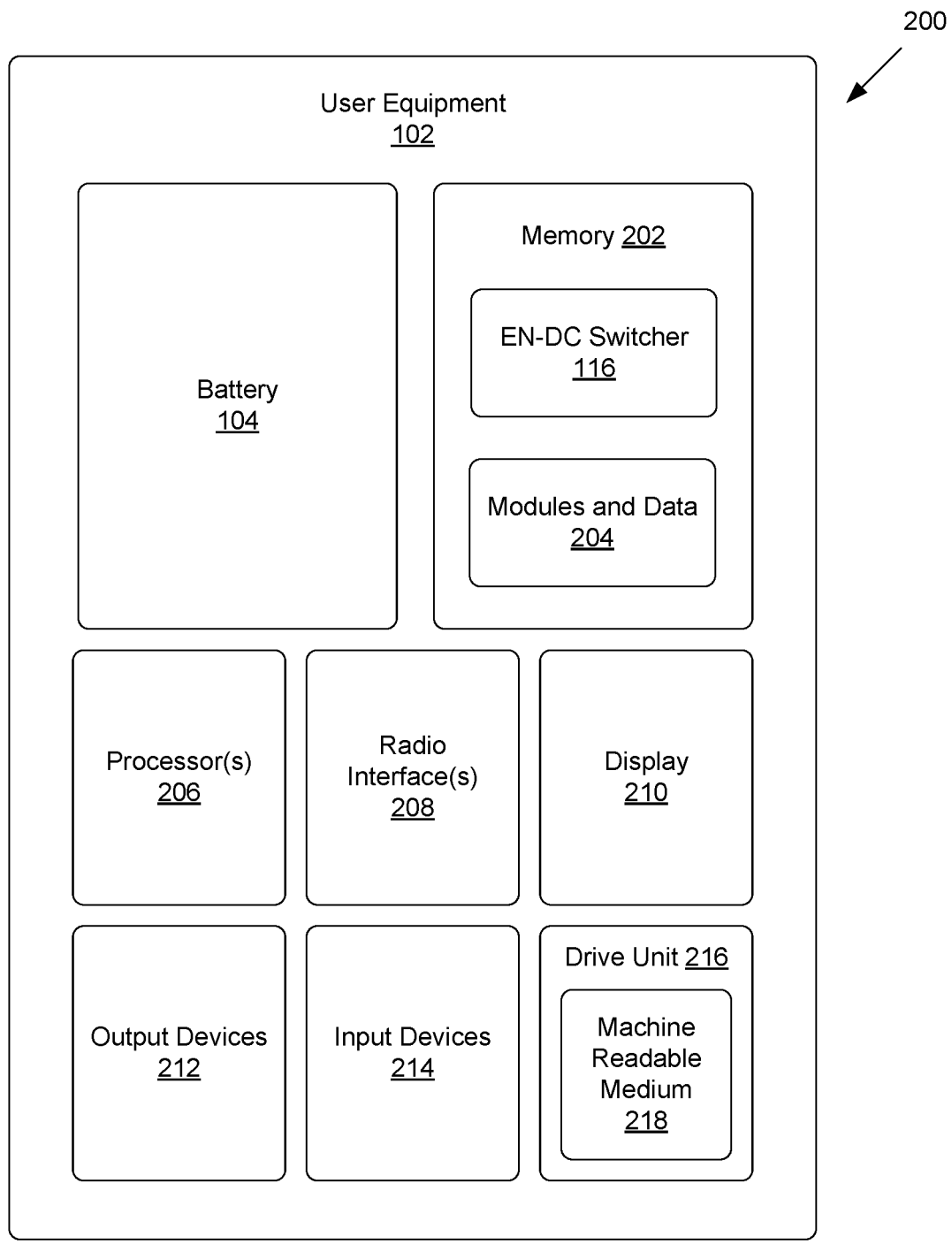
FIG. 2 depicts an example system architecture for a UE.

FIG. 2 depicts an example system architecture for the UE 102, in accordance with various examples. As discussed above, the UE 102 can have a battery 104, such as a Li-ion battery, a LiPo battery, a NiCd battery, a NiMH battery, or other type of battery. The UE 102 can also have at least one memory 202 storing the EN-DC switcher 116 and other modules and data 204. The UE 102 can also have processor(s) 206, radio interfaces 208, a display 210, output devices 212, input devices 214, and/or a drive unit 216 including a machine readable medium 218.

In various examples, the memory 202 can include system memory, which may be volatile (such as RAM), non-volatile (such as ROM, flash memory, etc.) or some combination of the two. The memory 202 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store the desired information and which can be accessed by the UE 102. Any such non-transitory computer-readable media may be part of the UE 102.

The EN-DC switcher 116 stored in the memory 202 can include one or more software or firmware elements, such as computer-readable instructions that are executable by the one or more processors 206. The other modules and data 204 stored in the memory 202 can be utilized by the UE 102 to perform or enable performing any action taken by the UE 102. The modules and data 204 can include a UE platform, operating system, and applications, and data utilized by the platform, operating system, and applications.

In various examples, the processor(s) 206 can be a central processing unit (CPU), a graphics processing unit (GPU), or both CPU and GPU, or any other type of processing unit. Each of the one or more processor(s) 206 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 206 may also be responsible for executing all computer applications stored in the memory 202, which can be associated with common types of volatile (RAM) and/or nonvolatile (ROM) memory.

The radio interfaces 208 can include transceivers, modems, interfaces, antennas, and/or other components that perform or assist in exchanging radio frequency (RF) communications with base stations of the telecommunication network, a Wi-Fi access point, or otherwise implement connections with one or more networks. For example, the radio interfaces 208 can be compatible with multiple radio access technologies, such as 5G NR radio access technologies and LTE radio access technologies. The radio interfaces 208 can thus be configured to establish the LTE connection 112 with the eNB 108 alone, and/or as part of an EN-DC connection that also includes the 5G connection 114 with the gNB 110 as described herein.

The display 210 can be a liquid crystal display or any other type of display commonly used in UEs. For example, the display 210 may be a touch-sensitive display screen, and can thus also act as an input device or keypad, such as for providing a soft-key keyboard, navigation buttons, or any other type of input. In some examples, an operating system, firmware, or other element of the UE 102 can provide status information about the display 210 to the EN-DC switcher 116, such as whether the display 210 is turned on or off, or whether a user is interacting with touch-sensitive elements of the display 210.

The output devices 212 can include any sort of output devices known in the art, such as the display 210, speakers, a vibrating mechanism, and/or a tactile feedback mechanism. Output devices 212 can also include ports for one or more peripheral devices, such as headphones, peripheral speakers, and/or a peripheral display.

The input devices 214 can include any sort of input devices known in the art. For example, input devices 214 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism. The input devices 214 can also include cameras and/or other sensors. For example, the input devices 214 can include a front-facing camera, infrared sensor, light sensor, proximity sensor, and/or other sensors that can be configured to perform facial recognition, detect when a face of a user is oriented toward the display 210, or perform eye tracking processes to detect when eyes of the user are looking at the display 210, any or all which may be indicative of whether the user is actively looking at the display 210.

The machine readable medium 218 can store one or more sets of instructions, such as software or firmware, that embodies any one or more of the methodologies or functions described herein. The instructions can also reside, completely or at least partially, within the memory 202, processor(s) 206, and/or radio interface(s) 208 during execution thereof by the UE 102. The memory 202 and the processor(s) 206 also can constitute machine readable media 518.

Figure 3:
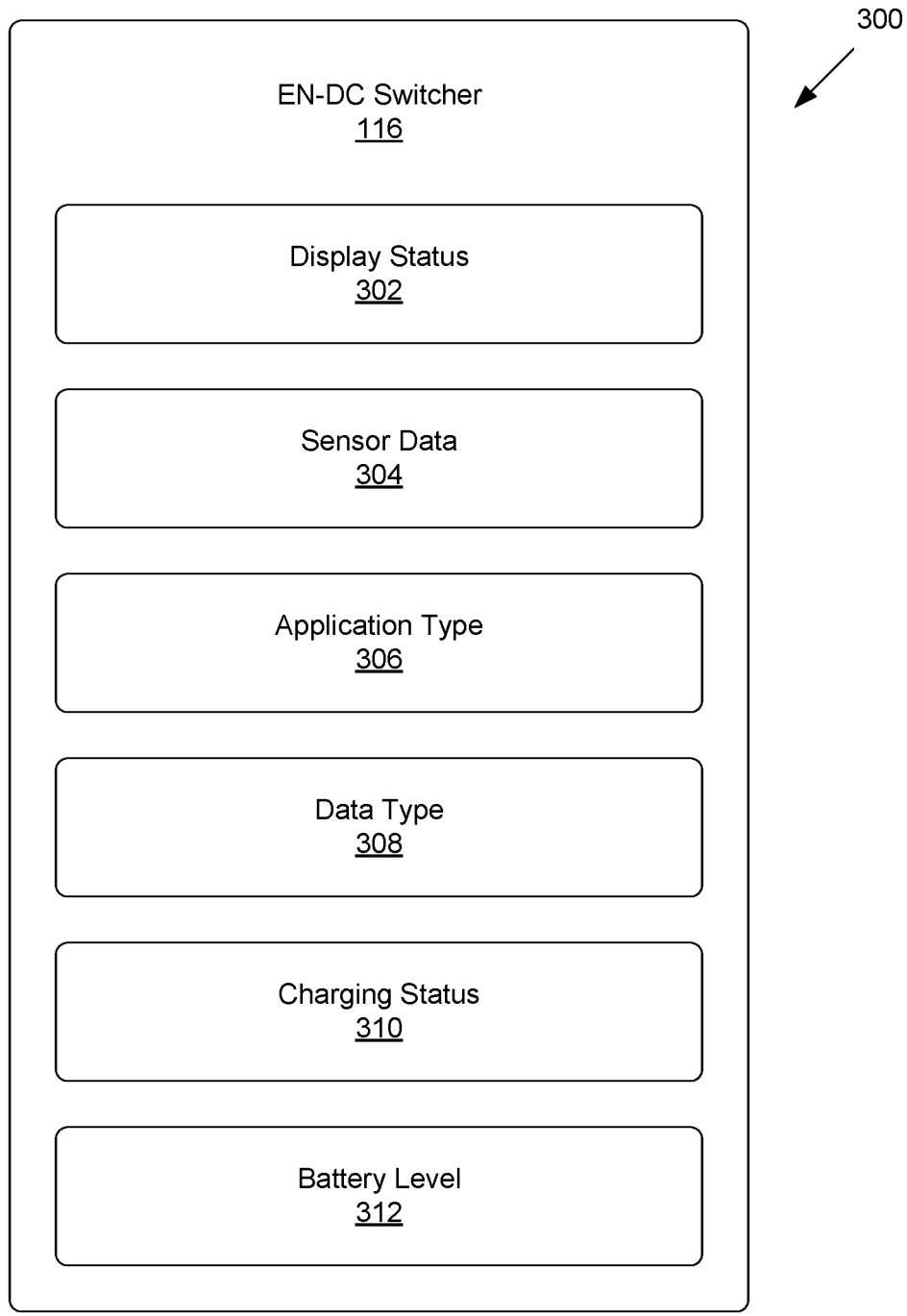
FIG. 3 shows example factors that the EN-DC switcher executing on a UE can consider when determining whether the UE should use an EN-DC connection or an LTE connection alone.

FIG. 3 shows example factors 300 that the EN-DC switcher 116 can consider when determining whether the UE 102 should use an EN-DC connection or an LTE connection 112 alone. The factors 300 considered by the EN-DC switcher 116 can include a display status 302, sensor data 304, an application type 306, a data type 308, a charging status 310, a battery level 312, and/or other factors.

The display status 302 can include information about the display 210 of the UE 102. In some examples, the display status 302 may indicate that the display 210 is active or inactive, such as whether the display 210 is turned on and/or displaying images, or is turned off and/or not displaying images. In some examples, the display status 302 may indicate whether the display 210 of the UE 102 is in active use by a user. For example, if the display 210 is a touch-sensitive screen, the display status 302 may indicate whether touch inputs are being received from a user. The display status 302 may include information from firmware, an operating system, or other elements of the UE 102 associated with the display 210 and/or displaying information via the display 210. For instance, the operating system may maintain a flag indicating whether the display 210 is active or inactive, which can be reported to or accessed by the EN-DC switcher 116 for use as the display status 302.

The EN-DC switcher 116 can be configured to consider the display status 302 when determining whether to use an EN-DC connection or to use an LTE connection 112 alone. For example, when the display status 302 indicates that the display 210 is turned off, or is otherwise not displaying images, the display status 302 may indicate that a user is not actively using the UE 102, and thus that that user may be unlikely to perceive throughput increases or other benefits associated with an EN-DC connection relative to an LTE connection 112 alone. Accordingly, when the display status 302 indicates that the display 210 is turned off, in some situations the EN-DC switcher 116 may determine that the LTE connection 112 should be used alone in order to drain the battery 104 of the UE 102 more slowly. However, if the display status 302 instead indicates that the display 210 is turned on, there may be a higher likelihood that a user is actively using the UE 102. If the user is actively using the UE 102, the user may also be more likely to perceive throughput increases or other benefits associated with an EN-DC connection, for instance during an active download of a data file or during a media streaming session. Accordingly, when the display status 302 indicates that the display 210 is turned on, in some situations the EN-DC switcher 116 may determine to use the EN-DC connection despite more quickly draining the battery 104.

The sensor data 304 can include information from cameras, sensors, and/or other input devices 214 of the UE 102. As discussed above, the input devices 214 may include a front-facing camera, infrared sensor, light sensor, proximity sensor, and/or other sensors. The sensor data 304 may include data captured by such sensors, or data derived from the data captured by the sensors. For example, an operating system of the UE 102 can be configured to use data captured by front-facing sensors to perform facial recognition, detect when a face of a user is oriented toward the display 210 of the UE 102, and/or when eyes of the user are looking at the display 210. The operating system may maintain a flag indicating when a face of user is detected as being oriented toward the display 210, and/or when the face of the user has been recognized. The EN-DC switcher 116 can access such data from the operating system for use as sensor data 304. In other examples, facial recognition, face orientation detection, and/or eye tracking processes can be performed by the sensors, corresponding firmware or software, or other elements of the UE 102, and facial recognition, face orientation data, and/or eye tracking data can be reported to or accessed by the EN-DC switcher 116 for use as the sensor data 304. In still other examples, raw sensor data 304 from the input devices 214 can be accessed by the EN-DC switcher 116, and the EN-DC switcher 116 can itself be configured to determine if the sensor data 304 indicates that a face of a user is oriented toward the display 210 or that eyes of the user are looking at the display 210.

The EN-DC switcher 116 can be configured to consider the sensor data 304 when determining whether to use an EN-DC connection or to use an LTE connection 112 alone. For example, if the sensor data 304 indicates that a user is not looking at the display 210 of the UE 102, the user may be unlikely to perceive throughput increases or other benefits associated with an EN-DC connection relative to an LTE connection 112 alone. Accordingly, when the sensor data 304 indicates that a user is not actively looking at the display, in some situations the EN-DC switcher 116 may determine that the LTE connection 112 should be used alone in order to drain the battery 104 of the UE 102 more slowly. However, if the sensor data 304 instead indicates that the user is looking at the display 210, the user may be more likely to perceive throughput increases or other benefits associated with an EN-DC connection. Accordingly, when the sensor data 304 indicates that the user is looking at the display 210, in some situations the EN-DC switcher 116 may determine to use the EN-DC connection despite more quickly draining the battery 104.

The application type 306 may indicate a type of application being executed by the UE 102. For example, the application type 306 may indicate that the application is a video streaming application, a web browser, a social media application, or any other type or class of application. In some examples, the application type 306 may directly identify the specific application being executed by the UE 102, via an application name, process name, or other unique identifier. In some examples, operating system data may indicate the type and/or identify of the application being executed by the UE 102.

The EN-DC switcher 116 can be configured to consider the application type 306 when determining whether to use an EN-DC connection or to use an LTE connection 112 alone. For example, if the application type 306 indicates that the UE 102 is executing a media application, the EN-DC switcher 116 may determine that the increased throughput or other benefits of the EN-DC connection may provide a better user experience when the media application is downloading or streaming media, relative to using the LTE connection 112 alone. However, as another example, if the application type 306 instead indicates that the UE 102 is executing a web browser or other application that only infrequently uploads or downloads data, a user may be less likely to notice when the data is sent or received at lower throughput levels associated with the LTE connection 112 alone. Accordingly, the EN-DC switcher 116 may determine to use the LTE connection 112 alone instead of the EN-DC connection.

In some examples, the EN-DC switcher 116 can be configured with a predefined list of applications and/or types of application, along with corresponding indications of whether specific applications or types of applications should use an EN-DC connection or an LTE connection 112 alone.

Accordingly, in such examples, the EN-DC switcher 116 can use information about the application type 306 to find a corresponding entry on the predetermined list, and determine if the application is associated with a predefined preference for using an EN-DC connection or an LTE connection 112 alone. The EN-DC switcher 116 may use such an entry on the predetermined list when determining whether to use the EN-DC connection or the LTE connection 112 alone. In some examples, the predefined list may be included as part of a configuration for the EN-DC switcher 116, as discussed below with respect to FIG. 6.

The data type 308 may indicate a type and/or amount of data to be sent or received by the UE 102. For example, the data type 308 may indicate that an application executing on UE 102 is preparing to send or receive a relatively large media file, or that an application is preparing to send a relatively small heartbeat message to a server that indicates that the application is active and/or is listening for information from the server. In some examples, a modem or other radio interface 208 of the UE 102 can monitor and/or maintain information about the type and/or amount of data to be sent or received, which EN-DC switcher 116 can receive or access for use as the data type 308. In other examples, an operating system of the UE and/or application executing on the UE 102 can track or report information about the type and/or amount of data to be sent or received, which EN-DC switcher 116 can receive or access for use as the data type 308.

The EN-DC switcher 116 can be configured to consider the data type 308 when determining whether to use an EN-DC connection or to use an LTE connection 112 alone. For example, if the data type 308 indicates that the UE 102 is preparing to send or receive a large media file, the EN-DC switcher 116 may determine that the increased throughput or other benefits of the EN-DC connection may provide a better user experience during transmission of the large media file relative to using the LTE connection 112 alone. However, as another example, if the data type 308 instead indicates that the UE 102 is preparing to send a small heartbeat message to a server, the LTE connection 112 may offer sufficient throughput for transmission of the small heartbeat message. Additionally, because the heartbeat message may be part of a background process or other operation of which a user of the UE 102 may not be aware, the user is unlikely to perceive any impacts of using the LTE connection 112 instead of an EN-DC connection for transmission of the heartbeat message. Accordingly, the EN-DC switcher 116 may determine to use the LTE connection 112 alone to transmit the heartbeat message, instead of the EN-DC connection.

The charging status 310 may indicate whether or not the battery 104 of the UE 102 is being charged. For instance, an operating system, firmware, or software associated with the battery 104 may provide a flag or other indication of whether the UE 102 is connected to an external power source and the battery 104 is being charged. The EN-DC switcher 116 can receive or access such a flag or other indication for use as the charging status.

The EN-DC switcher 116 can be configured to consider the charging status 310 when determining whether to use an EN-DC connection or to use an LTE connection 112 alone. For example, if the charging status 310 indicates that the UE 102 is connected to an external power source and/or the battery 104 is being charged, the EN-DC switcher 116 may be configured to select the EN-DC connection because increased energy usage due to the EN-DC connection is not a concern while the UE 102 is connected to an external power source and/or the battery 104 is being charged. However, if the charging status 310 indicates that the UE 102 is not connected to an external power source and/or the battery 104 is not being charged, the EN-DC switcher 116 may use other factors 300 to determine whether to use the EN-DC connection or to use an LTE connection 112 alone.

The battery level 312 may indicate a current level of energy stored in the battery 104 of the UE 102. For instance, an operating system, firmware, or software associated with the battery 104 may provide a percentage or other value indicating a level of energy that is stored and available in the battery 104. The EN-DC switcher 116 can receive or access such energy storage levels for use as the battery level 312.

The EN-DC switcher 116 can be configured to consider the battery level 312 when determining whether to use an EN-DC connection or to use an LTE connection 112 alone. For example, if the battery level 312 indicates that the battery 104 is fully charged, or is charged to above a threshold level, may be configured to select the EN-DC connection because increased energy usage due to the EN-DC connection is less of a concern while the battery 104 is charged to a relatively high level. However, if the battery level 312 indicates that the energy level stored in the battery 104 is below a threshold percent, the EN-DC switcher 116 may use other factors 300 to determine whether to use the EN-DC connection or to use an LTE connection 112 alone.

In some examples, the EN-DC switcher 116 may also be configured to more aggressively choose to use the LTE connection 112 alone as the battery level 312 decreases. For example, if the battery level 312 is at 50%, the EN-DC switcher 116 may be moderately likely to select using the LTE connection 112 instead of the EN-DC connection. However, the EN-DC switcher 116 may be more likely to select using the LTE connection 112 instead of the EN-DC connection when the battery level 312 is at 10%, because the battery 104 is closer to being depleted and the LTE connection 112 may use less energy. In some examples, the EN-DC switcher 116 may be configured with a sliding scale of how aggressively the LTE connection 112 should be selected based on a scale of battery levels, or be configured with multiple thresholds for the battery level 312 that indicates how aggressively the LTE connection 112 should be selected over the EN-DC connection.

In some examples, the EN-DC switcher 116 can be configured to weight different factors 300 more heavily than other factors 300, and/or consider different factors 300 in different orders. For example, if the data type 308 indicates that data over a threshold size is to be transmitted by the UE 102, the EN-DC switcher 116 may be configured to weight that factor 300 more heavily than the display status 302 or other factors, and thus chose to use an EN-DC connection to send the data even though the display 210 is turned off. However, in other examples, the EN-DC switcher 116 may be configured to weight the display status 302 equally with, or more heavily than, the data type 308.

Figure 4:
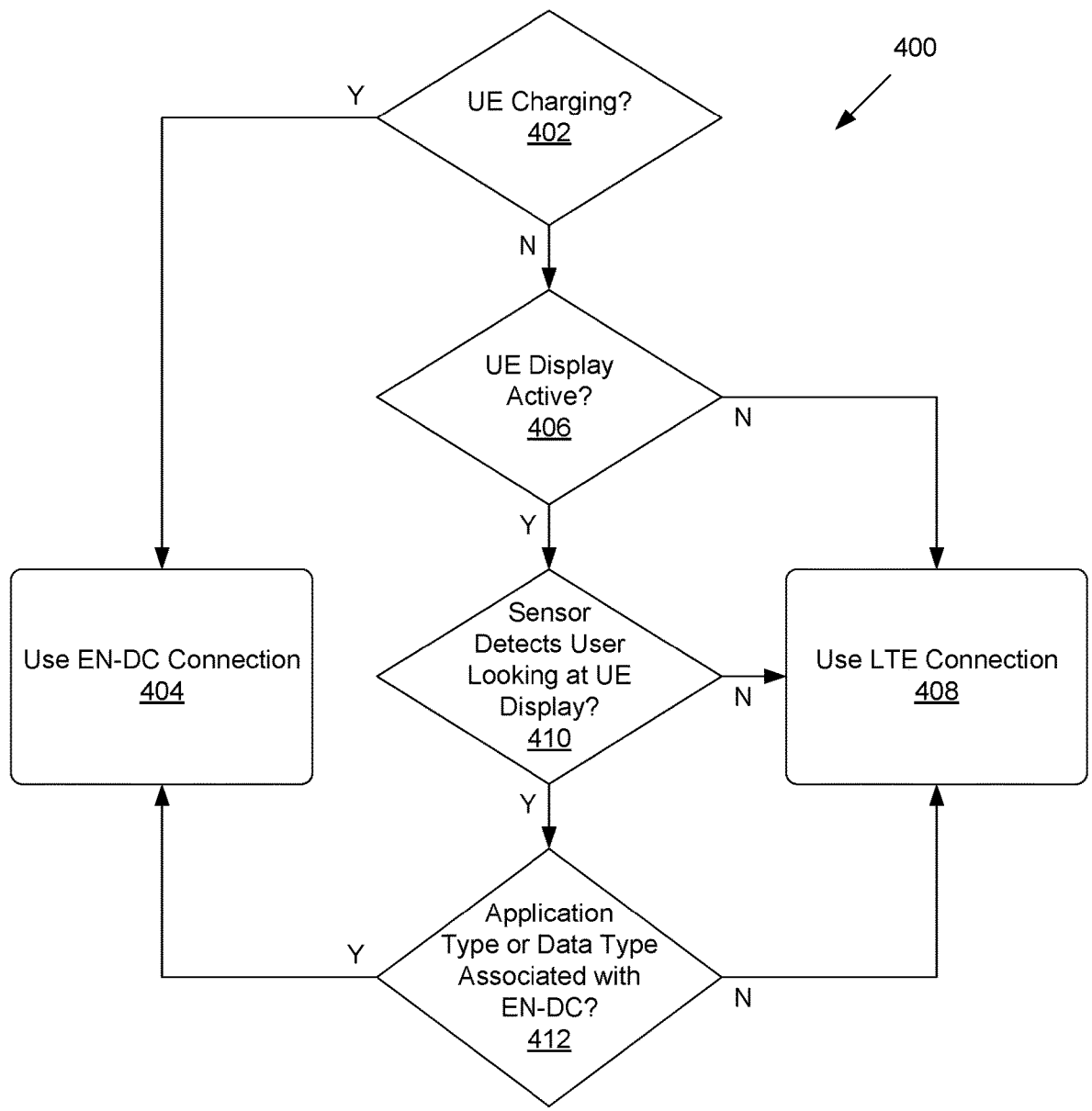
FIG. 4 shows a flowchart of a first example method for determining whether to use an EN-DC connection or to use an LTE connection alone.

FIG. 4 shows a flowchart of a first example method 400 for determining whether to use an EN-DC connection or to use an LTE connection 112 alone. The EN-DC switcher 116 can use method 400 to evaluate some or all of the factors 300, and select to use the EN-DC connection or the LTE connection 112 alone.

A block 402, the EN-DC switcher 116 can determine if the UE 102 is being charged. For example, the EN-DC switcher 116 can use the charging status 310 to determine if the UE 102 is connected to an external power source and/or if the battery 104 of the UE 102 is being charged. If the EN-DC switcher 116 determines that the UE 102 is being charged at block 402, the EN-DC switcher 116 can select to use an EN-DC connection at block 404. In this situation, increased energy usage associated with the EN-DC connection may not be a concern because the UE 102 is being charged.

If the EN-DC switcher 116 determines at block 402 that the UE 102 is not being charged, the EN-DC switcher 116 can determine if the display 210 of the UE 102 is active at block 406. For example, the EN-DC switcher 116 can use the display status 302 to determine if the display 210 is turned on and/or is displaying images. If the EN-DC switcher 116 determines that the display 210 of the UE 102 is not active at block 406, the EN-DC switcher 116 can select to use the LTE connection 112 alone at block 408. In this situation, a user of the UE 102 may be unlikely to perceive increased throughput or other benefits of an EN-DC connection relative to the LTE connection 112 alone, and thus the EN-DC switcher 116 can cause the UE 102 to drain the battery 104 less quickly by using the LTE connection 112 alone. Example methods the EN-DC switcher 116 can use at block 408 to cause the UE 102 to use the LTE connection alone 112 are discussed in more detail below with respect to FIGS. 7 and 8.

If the EN-DC switcher 116 determines at block 406 that the display 210 of the UE 102 is active, the EN-DC switcher 116 can determine whether sensor data 304 indicates that a user is looking at the display 210 at block 410. As discussed above, sensor data 304 from a front-facing camera, infrared sensor, light sensor, proximity sensor, or other input devices 214 may indicate whether a face of a user is oriented toward the display 210 and/or whether eyes of the user are looking at the display 210. If the EN-DC switcher 116 determines at block 410 that a user is not looking at the display 210, even if the display 210 is active, the EN-DC switcher 116 can select to use the LTE connection 112 alone at block 408. In this situation, because the user is not looking at the display 210 to view status information associated with a data transfer, or other information associated with a data transfer, the user may be unlikely to perceive increased throughput or other benefits of an EN-DC connection. Accordingly, the EN-DC switcher 116 can cause the UE 102 to drain the battery 104 less quickly by using the LTE connection 112 alone. Example methods the EN-DC switcher 116 can use at block 408 to cause the UE 102 to use the LTE connection alone 112 are discussed in more detail below with respect to FIGS. 7 and 8.

If the EN-DC switcher 116 determines at block 410 that a user is looking at the display 210, the EN-DC switcher 116 can determine whether an application type 306 and/or data type 308 is associated with an EN-DC connection at block 412. As discussed above, increased throughput or other benefits of an EN-DC connection may provide a better user experience for users of certain applications or types of applications, or for certain types of data or amounts of data. If the EN-DC switcher 116 determines that the type or amount of data to be sent or received, based on the data type 308 itself and/or the application type 306 that will be sending or receiving the data, would lead to an improved user experience if the data is transferred over an EN-DC connection, the EN-DC switcher 116 can select to use the EN-DC connection at block 404. However, if the type of data is a heartbeat message or other type of background message of which a user would not be aware, the EN-DC switcher 116 can select to use the LTE connection 112 alone at block 408. Similar, if the type or amount of data can be transmitted using lower throughput associated with the LTE connection 112 alone, instead of using higher throughput provided by an EN-DC connection, with a user of the UE 102 being unlikely to perceive the difference in throughput, the EN-DC switcher 116 can select to use the LTE connection 112 alone at block 408. Example methods the EN-DC switcher 116 can use at block 408 to cause the UE 102 to use the LTE connection alone 112 are discussed in more detail below with respect to FIGS. 7 and 8.

Although FIG. 4 shows an example of multiple operations based on different factors 300 that the EN-DC switcher 116 can use to select between using an EN-DC connection or an LTE connection 112 alone. However, the order of the operations shown in FIG. 4 is not intended to be limiting, and the EN-DC switcher 116 may perform the operations in any order, and/or perform fewer and/or more operations based on different factors 300. For example, the EN-DC switcher 116 may consider the application type 306 and/or data type 308 at block 412 before then considering whether the display 210 of the UE 102 is active at block 406, or otherwise perform any one or more of the operations of FIG. 4 in any order.

Figure 5:
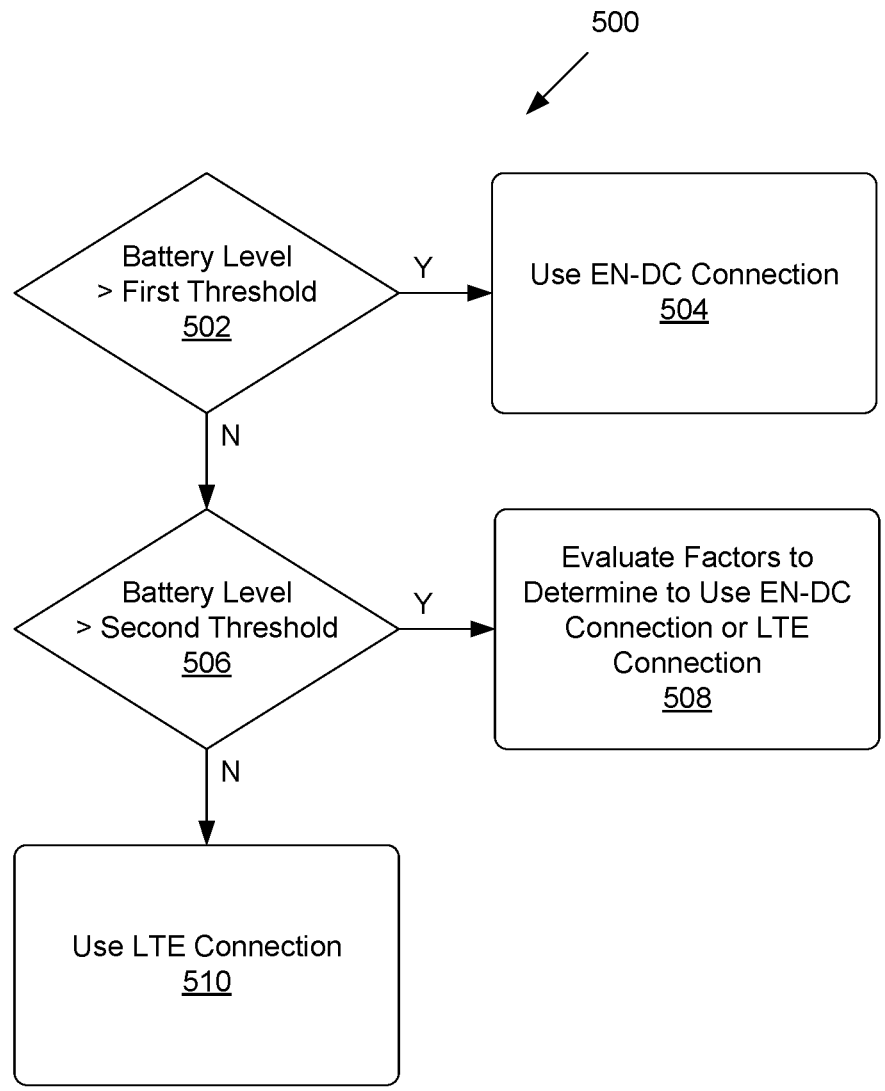
FIG. 5 shows a flowchart of a second example method for determining whether to use an EN-DC connection or to use an LTE connection alone.

FIG. 5 shows a flowchart of a second example method 500 for determining whether to use an EN-DC connection or to use an LTE connection 112 alone. The EN-DC switcher 116 can use method 500 to evaluate at least the battery level 312, and select to use the EN-DC connection or the LTE connection 112 alone.

At block 502, the EN-DC switcher 116 can determine whether the battery level 312 is above a first threshold level. In some examples, the first threshold level can be a relatively high percentage, such as 90%, 85%, 80%, or any other percentage. If the EN-DC switcher 116 can determines that the battery level 312 is above the first threshold level, the EN-DC switcher 116 can select to use an EN-DC connection at block 504. In this situation, higher energy usage associated with the EN-DC connection relative to the LTE connection 112 alone may not be a significant concern because the battery 104 of the UE 102 has an energy level above the first threshold level. In some examples, the EN-DC switcher 116 may also use the charging status 310 at block 502 to determine if the UE 102 is being charged, and may also choose to use an EN-DC connection at block 504 if the charging status 310 indicates that the UE 102 is being charged, similar to block 402 of FIG. 4.

At block 506, the EN-DC switcher 116 can determine whether the battery level 312 is above a second threshold level. The second threshold level can be set at a lower level than the first threshold level. In some examples, the second threshold level can be 30%, 25%, 20%, 15%, 10%, 5%, or any other percentage. If the EN-DC switcher 116 determines at block 506 that the battery level 312 is below the first threshold but above the second threshold, the EN-DC switcher 116 can consider one or more factors 300 at block 508 to determine whether to use an EN-DC connection or to use an LTE connection 112 alone. For example, at block 508 the EN-DC switcher 116 may use the method 400 described above to evaluate one or more factors 300 and select to use the EN-DC connection or to use the LTE connection 112 alone.

However, if at block 506 the EN-DC switcher 116 determines that the battery level 312 is below the second threshold level, the EN-DC switcher 116 may be configured to select to use the LTE connection 112 alone at block 510 as an energy saving technique. For example, if the battery level 312 is below 20%, or any other second threshold level, the EN-DC switcher 116 may be configured to use the LTE connection 112 alone instead of the EN-DC connection to extend the battery life of the UE 102, even if data being sent or received by the UE 102 would benefit from increased throughput provided by the EN-DC connection.

In alternate examples, when the battery level 312 is below the second threshold level, the EN-DC switcher 116 may instead be configured at block 510 to display a selectable option to a user of the UE 102 via the display 210 that asks the user to select to use the EN-DC connection at the trade-off of more quickly draining the battery 104, or to select to use the LTE connection 112 alone to drain the battery 104 less quickly. In still other examples, when the battery level 312 is below the second threshold level, at block 510 the EN-DC switcher 116 may be configured to display a notification on the display 210. The notification may warn a user about impacts on battery life associated with the EN-DC connection and/or possible impacts on user experience associated with using the LTE connection 112 alone, request that the user delay a requested download or upload until the battery life is above the second threshold level, or otherwise indicate possible effects on the battery 104 and/or user experience associated with using the LTE connection 112 or the EN-DC connection.

Figure 6:
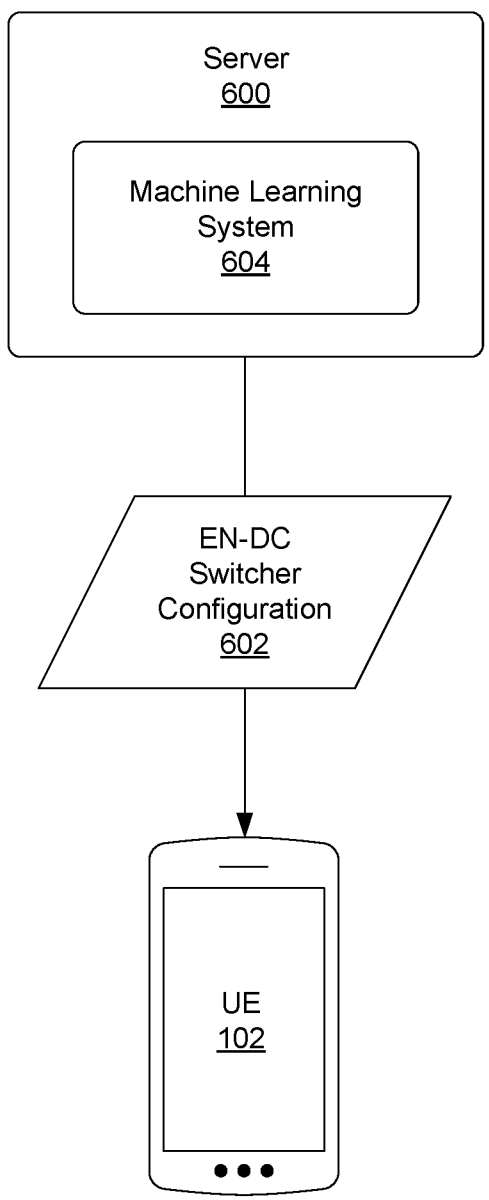
FIG. 6 shows an example of a server that is configured to provide an EN-DC configuration to a UE.

FIG. 6 shows an example of a server 600 that is configured to provide an EN-DC switcher configuration 602 to the UE 102. The EN-DC switcher configuration 602 may be a configuration file that can be used by the EN-DC switcher 116, an update to the EN-DC switcher 116, a new version of the EN-DC switcher 116, or any other type of data that can adjust the operations of the EN-DC switcher 116. For example, the EN-DC switcher configuration 602 may adjust which factors 300 are considered by the EN-DC switcher 116, add or delete factors 300 to be considered by the EN-DC switcher 116, adjust a relative order of when the EN-DC switcher 116 considers different factors 300, adjusts weights associated with different factors 300, adjusts one or more threshold levels used to evaluate the battery level 312, adjusts how aggressive the EN-DC switcher 116 is at selecting to use the LTE connection 112 alone relative to the battery level 312 or other factors 300, and/or adjusts any other operation or data used by the EN-DC switcher 116.

The server 600 can be a computer or other computing device that can execute computer-readable instructions to send the EN-DC switcher configuration 602 to the UE 102 via a network, such as the telecommunication network. For example, the server 600 can have processors, data interfaces, memory, machine readable media, and/or other computer architecture elements similar to the elements of the UE 102 shown in FIG. 2. In some examples, the server 600 may be operated by an operator of the telecommunication network, such that the operator can provide the EN-DC switcher configuration 602 to adjust how the UE 102 selects between using EN-DC connections and LTE connections 112 alone. For example, the server 600 may be part of the core network 106, a radio access network, or other element of the telecommunication network. In other examples, the server 600 may be operated by a vendor or manufacturer of the UE 102, or any other entity.

In some examples, the EN-DC switcher configuration 602 may be based in part on a type or model of the UE 102. For example, a first type of UE may have more advanced battery or energy management processes, while a second type of UE may have less advanced battery or energy management processes. Accordingly, the server 600 may provide a first EN-DC configuration to the first type of UE that is less aggressive in selecting to use an LTE connection 112 alone, because the more advanced battery or energy management processes already used in the first type of UE may at least partially mitigate the energy concerns associated with using the EN-DC connection instead of using the LTE connection 112 alone. However, the server 600 may provide a second EN-DC configuration to the second type of UE that is more aggressive in selecting to use an LTE connection 112 alone, due to the less advanced battery or energy management processes natively used in the second type of UE.

In some examples, the server 600 can include, or be associated with, a machine learning system 604 that can generate the EN-DC switcher configuration 602. For example, the machine learning system 604 can evaluate various factors 300 and determine which factors 300 should be considered by the EN-DC switcher 116, values that the EN-DC switcher 116 can use to weight different factors 300, an order in which to consider the factors 300, and/or otherwise determine how the EN-DC switcher 116 should evaluate factors 300. The machine learning system 604 can accordingly generate the EN-DC switcher configuration 602 to indicate the determined factors 300, weights for factors 300, and/or other adjustments to how the EN-DC switcher 116 operates.

The machine learning system 604 can be based on support-vector networks, linear regression, logistic regression, nearest-neighbor algorithms, decision trees, recurrent neural networks or other types of neural networks, and/or other machine learning and/or artificial intelligence techniques. In some examples, the machine learning system 604 can be trained using supervised machine learning based on training sets of factors 300 reported by one or more UEs and/or corresponding user feedback.

For example, EN-DC switchers executing across multiple UEs can be configured to occasionally or periodically report factors 300 associated with the UEs to the server 600, such that a training dataset of historical factors 300 can be created from the reported factors 300. The server 600 may also receive user feedback data from the EN-DC switchers, from the UE, from a user feedback portal of the telecommunication network, or any other source. For example, the user feedback data may be based on user satisfaction surveys or other user feedback indicating when users did and did not perceive the benefits of EN-DC connections, whether users noticed throughput differences associated with EN-DC connections or LTE connections 112 alone, or whether users would have preferred to extend battery life or to achieve higher throughput in different situations. Such user feedback data may also be used in the training set.

The machine learning system 604 may attempt to use the factors 300 in the training set to make predictions that substantially reproduce the user feedback data in the training set. For example, the machine learning system 604 may continually adjust weights associated with the factors 300, which factors 300 are considered, which order the factors 300 are considered, and/or other variables until the machine learning system 604 can use the factors 300 to reproduce the user feedback. The machine learning system 604 can accordingly be trained to determine which combinations of factors 300 indicate when a user is more or less likely to prefer using an LTE connection 112 alone relative to using an EN-DC connection, and/or which combinations of factors 300 indicate that users may be less likely to perceive decreased throughput associated with using an LTE connection 112 alone relative to increased throughput associated with using an EN-DC connection. The machine learning system 604 can accordingly use the determined factors to generate an EN-DC switcher configuration 602 that can be provided by the server 600 to the UE 102 to adjust the operations of the EN-DC switcher 116 on the UE 102.

Figure 7:
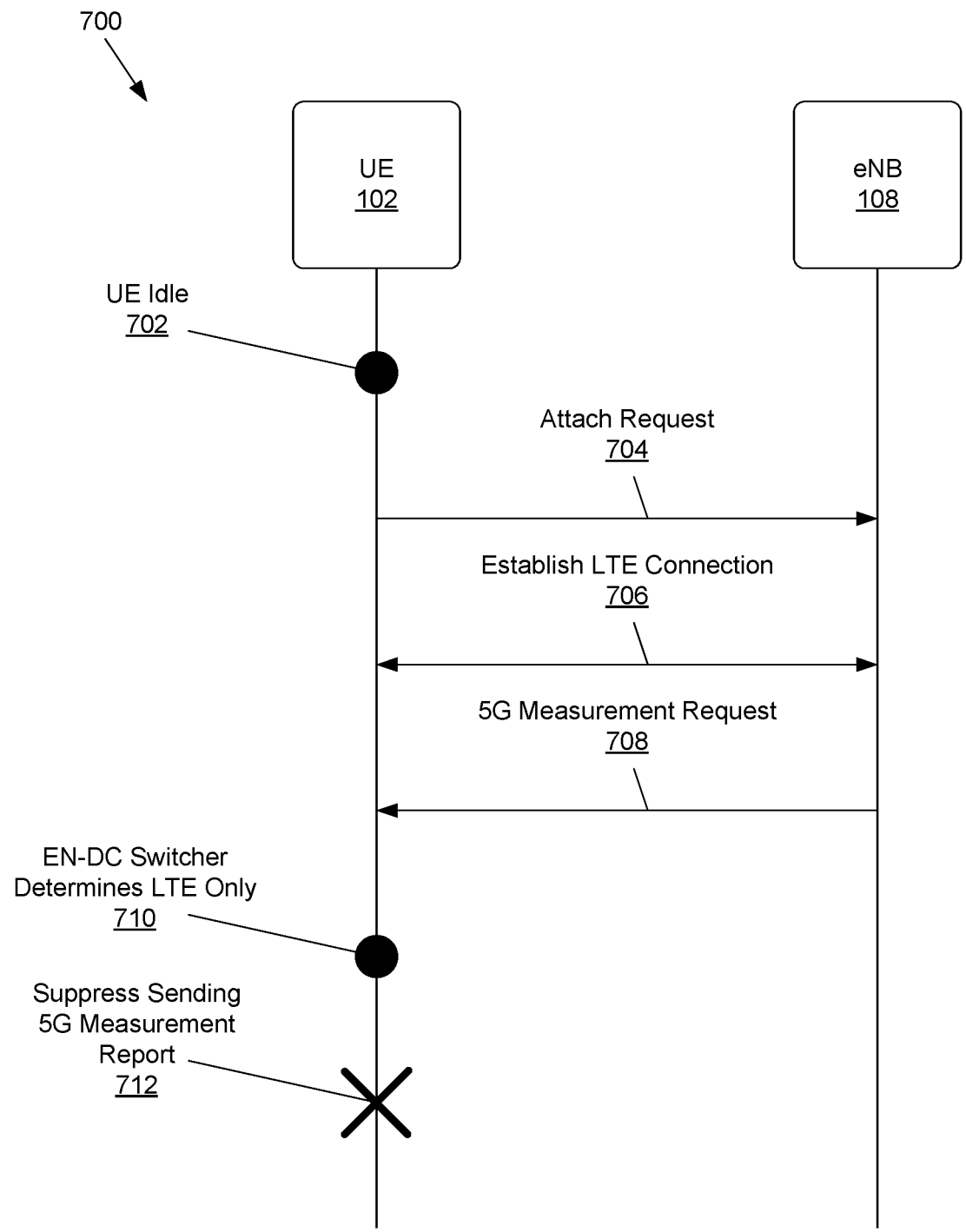
FIG. 7 shows a first sequence diagram of example operations and messages a UE can use to prevent an EN-DC connection from being established.

FIG. 7 shows a first sequence diagram 700 of example operations and messages the UE 102 can use to prevent an EN-DC connection from being established, when the EN-DC switcher 116 determines that the LTE connection 112 should be used alone, without the 5G connection 114.

At point 702, the UE 102 can be idle. For example, the UE 102 may be in an Radio Resource Control (RRC) idle state in which no active connection exists between the UE 102 and the eNB 108. However, when the UE 102 determines that data is to be exchanged with the UE 102, the UE 102 can enter an active or connected state and send a connection request to the eNB 108 at point 704. For example, the UE 102 can change from an RRC idle state to an RRC connected state when the UE 102 receives a paging message from the eNB 108 indicating that the telecommunication network has data to send to the UE 102, or because the UE 102 has data to send via the telecommunication network. In some examples, the connection request can be an RRC connection request. In response to the connection request, at point 706 the UE 102 and the eNB 108 can establish the LTE connection 112. Establishment of the LTE connection 112 can include establishing one or more bearers associated with the LTE connection 112.

At point 708, the eNB 108 can send a 5G measurement request to the UE 102. In some examples, the 5G measurement request can be included in an RRC reconfiguration message sent by the eNB 108. The 5G measurement request can request that the UE 102 measure signal strengths and/or other attributes related to 5G NR frequencies that may be used to connect to the gNB 110, and send a 5G measurement report containing such measurements to the eNB 108. In some examples, the eNB 108 can be configured to determine from the 5G measurement report returned by the UE 102 whether the measurements are sufficient for a 5G connection 114, and if so instruct the gNB 110 to establish the 5G connection 114 with the UE 102 in addition to the LTE connection 112 established at point 706. In other examples, the eNB 108 may pass the 5G measurement report to the gNB 110 or other network entity to determine whether to establish the 5G connection 114.

However, at point 710 the EN-DC switcher 116 can determine that the UE 102 should not use an EN-DC connection that includes the 5G connection 114, and should instead continue using just the LTE connection 112 established at point 706. For example, the EN-DC switcher 116 may determine that using the EN-DC connection to send or receive data would not have a perceivable benefit to a user of the UE 102 relative to using the LTE connection 112 alone, and/or would drain the battery 104 at a rate that is not considered worth the benefits of the EN-DC connection relative to the LTE connection 112 alone. Factors that the EN-DC switcher 116 can use to determine whether to use an EN-DC connection or the LTE connection 112 alone are discussed in more detail above with respect to FIGS. 3-5.

Based on determining that the UE 102 should not use an EN-DC connection at point 710, the EN-DC switcher 116 can suppress the 5G measurement report at point 712. In some examples, the EN-DC switcher 116 can suppress the 5G measurement report by causing the UE 102 to not send the 5G measurement report to the eNB 108. In other examples, the EN-DC switcher 116 can suppress the 5G measurement report by altering the measurements in the 5G measurement report such that the measurements appear to the eNB 108 as being too weak, or otherwise insufficient, to support the 5G connection 114.

Even if 5G measurements taken by the UE 102 would have indicated sufficient conditions for the 5G connection 114 if the 5G measurement report had not been suppressed, the suppression of the 5G measurement report can cause the eNB 108 and/or the gNB 110 to determine that the 5G connection 114 should not be established. For example, when the UE 102 does not send the 5G measurement report at point 712, the eNB 108 may interpret the lack of a returned 5G measurement report as an indication that the UE 102 is not near the gNB 110 or that the UE 102 does not support 5G NR. Accordingly, the eNB 108 may determine not to instruct or cause the gNB 110 to establish the 5G connection 114 with the UE 102. The UE 102 may remain connected to the eNB 108 via the LTE connection 112 established at point 706, and an EN-DC connection may not be established.

FIG. 7 accordingly shows operations and messages in a situation in which the UE 102 changes from an idle state to a connected state and the EN-DC switcher 116 determines that an EN-DC connection should not be used. If the EN-DC switcher 116 instead determines that an EN-DC connection can be used, the EN-DC switcher 116 may determine not to suppress the 5G measurement report. The UE 102 can accordingly take the requested 5G measurements and report the 5G measurements to the eNB 108 and/or the gNB 110 in a 5G measurement report. If the telecommunication network determines that the 5G measurements are sufficient for the 5G connection 114, the gNB 110 and the UE 102 can establish the 5G connection 114 in addition to the LTE connection 112, and an EN-DC connection can be established for the UE 102.

Figure 8:
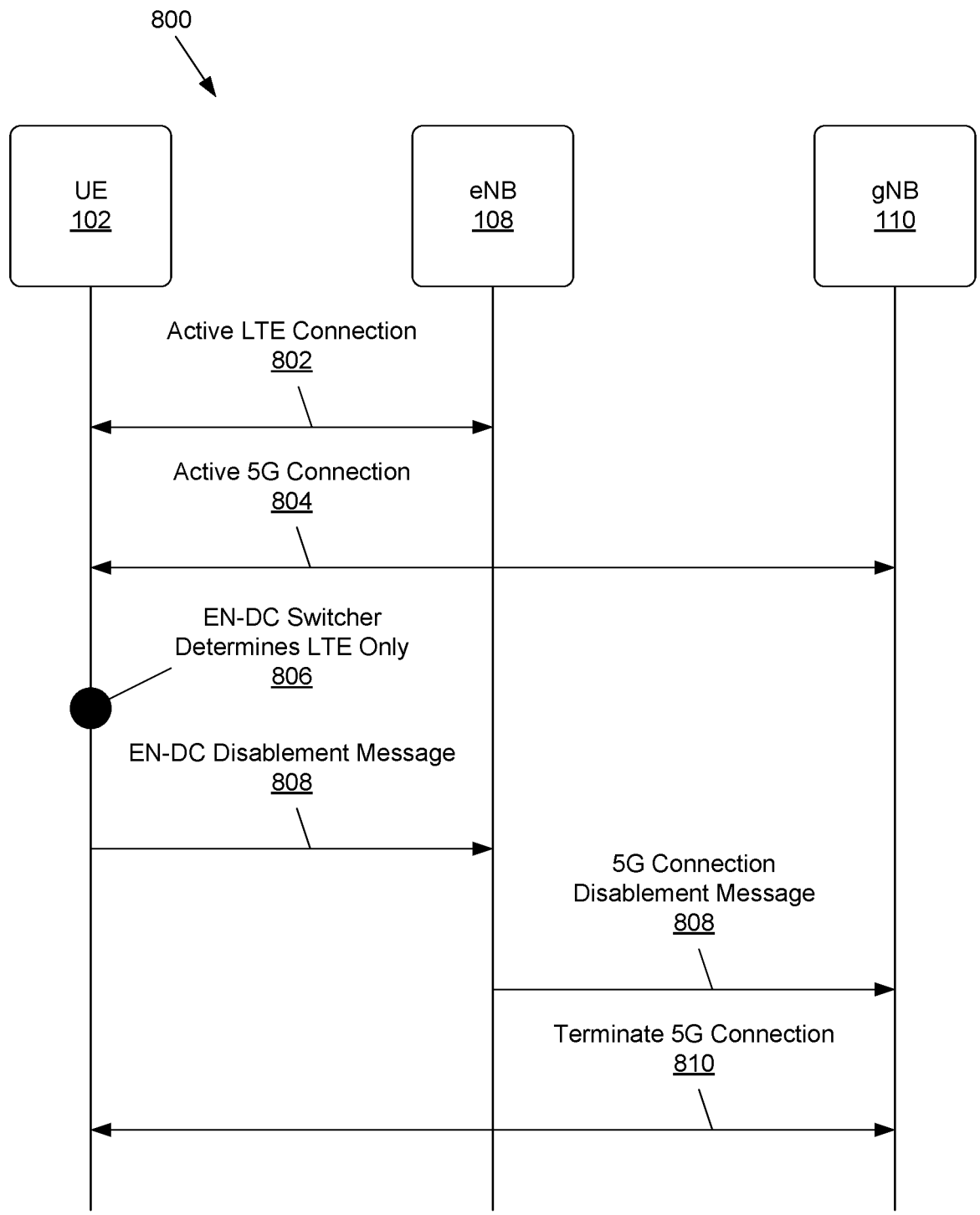
FIG. 8 shows a second sequence diagram of example operations and messages a UE can use to downgrade from an established EN-DC connection to an LTE connection alone.

FIG. 8 shows a second sequence diagram 800 of example operations and messages the UE 102 can use to downgrade from an established EN-DC connection to an LTE connection 112 alone. As shown in FIG. 8, the UE 102 can have an active EN-DC connection, including an active LTE connection 112 established with the eNB 108 at point 802 and an active 5G connection 114 established with the gNB 110 at point 804. The UE 102 may be in an RRC connected state, or other connected state, while the EN-DC connection is active. In some examples, the UE 102 may be using the EN-DC connection to upload and/or download data. For instance, the UE 102 may be using the EN-DC connection to stream video, or to perform an upload or download of a data file.

However, at point 806, the EN-DC switcher 116 can determine that the UE 102 should no longer use the EN-DC connection, and should continue using just the LTE connection 112 established at point 802. For example, the EN-DC switcher 116 may determine that continuing to use the EN-DC connection to send or receive data would not have a perceivable benefit to a user of the UE 102 relative to using the LTE connection 112 alone, and/or would drain the battery 104 at a rate that is not considered worth the benefits of the EN-DC connection relative to the LTE connection 112 alone. Factors that the EN-DC switcher 116 can use to determine whether to use an EN-DC connection or the LTE connection 112 alone are discussed in more detail above with respect to FIGS. 3-5.

Based on determining that the UE 102 should not use an EN-DC connection at point 806, the EN-DC switcher 116 can cause the UE 102 to send a EN-DC disablement message to the eNB 108 at point 808. In some examples, the EN-DC disablement message can be an RRC message that includes a flag or other value that signifies that the UE 102 has determined to use the LTE connection 112 alone, without also using the established 5G connection 114.

The eNB 108 can determine from the EN-DC disablement message that the 5G connection 114 should be terminated, and can send a corresponding 5G connection disablement message to the gNB 110 at point 810. In some examples, the 5G connection disablement message can be a forwarded copy of the EN-DC disablement message sent by the UE 102. In other examples, the 5G connection disablement message can be a different instruction or message from the eNB 108 to the gNB 110 that indicates that the 5G connection 114 should be terminated. In still other examples, the UE 102 may send a EN-DC disablement message or a 5G connection disablement message directly to the gNB 110 via the 5G connection 114.

At point 812, in response to the EN-DC disablement message and/or the 5G connection disablement message, the gNB 110 and/or UE 102 can terminate or tear down the 5G connection 114 to disable the EN-DC connection. However, the LTE connection 112 can remain active and in place, such that the UE 102 can continue sending and receiving data via the LTE connection 112 with the eNB 108. In other examples, the telecommunication network can terminate both the LTE connection 112 and the 5G connection 114 in response to the EN-DC disablement message to terminate the EN-DC connection, but can establish a new replacement LTE connection 112 with the UE 102 so that the UE 102 can continue sending and receiving data via the replacement LTE connection 112.

FIG. 8 accordingly shows operations and messages in a situation in which a UE 102 is in a connected state and is actively using an EN-DC connection, but determines to downgrade to using only the LTE connection 112 while the UE 102 remains in the connected state. In other situations, a UE 102 in a connected state may have one or both of an active LTE connection 112 and an active 5G connection 114, but may disable or tear down all of the active connections when the UE 102 changes to an inactive or idle state. For example, when the UE 102 changes from an RRC connected state to an RRC idle state, any existing LTE connections 112 and 5G connections 114 can be terminated or torn down. When the UE 102 next returns from the idle state to the connected state, and the EN-DC switcher 116 determines that only the LTE connection 112 should be used, the UE 102 can use the operations and messages shown in FIG. 7 to suppress a 5G measurement report and thereby avoid establishing an EN-DC connection with the telecommunication network. If the EN-DC switcher 116 instead determines that an EN-DC connection can be used when the UE 102 next returns from the idle state to the connected state, the UE 102 can send the 5G measurement report to the eNB 108, such that the 5G connection 114 can be established if the 5G measurements are sufficient for the 5G connection 114.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method, comprising:
   determining, by a user equipment (UE) associated with a telecommunication network, one or more factors associated with a status of the UE, wherein the UE supports establishing a dual connection that includes:
   a first connection between the UE and a first base station of the telecommunication network; and
   a second connection between the UE and a second base station of the telecommunication network;
   transitioning, by the UE, from an idle state to a connected state;
   establishing, by the UE, the first connection with the first base station;
   determining, by the UE, that the one or more factors meet a condition for using the first connection without using the second connection;
   using, by the UE, the first connection to send or receive data without using the second connection;
   receiving, by the UE, a measurement request from the telecommunication network; and
   suppressing, by the UE and in response to determining that the one or more factors meet the condition, sending a measurement report to the telecommunication network in response to the measurement request,
   wherein suppressing sending the measurement report causes the telecommunication network to avoid establishing the second connection with the UE.

2. The method of claim 1, wherein:
   at least one of the one or more factors is a display status of a display of the UE,
   the display status indicates that the display is turned off, and
   the condition is that the display is turned off.

3. The method of claim 1, wherein:
   at least one of the one or more factors is sensor data,
   the sensor data indicates that a user is not looking at a display of the UE, and
   the condition is that the user is not looking at the display.

4. The method of claim 1, wherein:
   at least one of the one or more factors is an application type or data type associated with the data to be sent or received,
   the data to be sent or received is at least one of:
   under a threshold size, or
   associated with a background process, and
   the condition is that the data to be sent or received is under the threshold size or is associated with the background process.

5. The method of claim 1, wherein:
   at least one of the one or more factors is a battery level of a battery of the UE,
   the battery level indicates that an energy level of energy stored in the battery is below a threshold percentage, and
   the condition is that the battery level is below the threshold percentage.

6. The method of claim 1, further comprising:
   establishing, by the UE, the dual connection with the telecommunication network; and
   sending, by the UE in response to determining that the one or more factors meet the condition, a dual connection disablement message to the telecommunication network,
   wherein the dual connection disablement message causes the second base station to disable the second connection.

7. The method of claim 1, further comprising receiving, by the UE from the telecommunication network, a configuration that adjusts the condition.

8. A user equipment (UE), comprising:
   one or more processors;
   one or more radio interfaces configured to support establishing a dual connection, with a telecommunication network, that includes:
   a Long-Term Evolution (LTE) connection between the UE and an LTE base station of the telecommunication network; and a fifth generation (5G) connection between the UE and a 5G base station of the telecommunication network; and memory storing computer-executable instructions that, when executed by the one or more processors, cause the UE to perform operations comprising:
  determining one or more factors associated with a status of the UE;
  determining that the one or more factors meet a condition for using the LTE connection without using the 5G connection; and
  using the LTE connection to send or receive data without using the 5G connection,
wherein at least one of the one or more factors is a display status of a display of the UE, the display status indicates that the display is turned off, and the condition is that the display is turned off.

9. The UE of claim 8, wherein:
the one or more factors further includes sensor data,
the one or more factors indicate that the UE does not detect a user looking at the display, and
the condition further includes that the UE has not detected a user is looking at the display.

10. The UE of claim 8, wherein:
at least one of the one or more factors is an application type or data type associated with the data to be sent or received,
the data to be sent or received is at least one of:
  under a threshold size, or
  associated with a background process, and
the condition further includes that the data to be sent or received is under the threshold size or is associated with the background process.

11. The UE of claim 8, wherein:
at least one of the one or more factors is a battery level of a battery of the UE,
the battery level indicates that an energy level of energy stored in the battery is below a threshold percentage, and
the condition further includes that the battery level is below the threshold percentage.

12. The UE of claim 8, wherein the operations further comprise:
transitioning the UE from an idle state to a connected state;
establishing the LTE connection with the LTE base station;
receiving a 5G measurement request from the telecommunication network; and
suppressing, in response to determining that the one or more factors meet the condition, sending a 5G measurement report to the telecommunication network in response to the 5G measurement request,
wherein suppressing sending the 5G measurement report causes the telecommunication network to avoid establishing the 5G connection with the UE.

13. The UE of claim 8, wherein the operations further comprise:
establishing the dual connection with the telecommunication network; and
sending, in response to determining that the one or more factors meet the condition, a dual connection disablement message to the telecommunication network,
wherein the dual connection disablement message causes the 5G base station to disable the 5G connection.

14. The UE of claim 8, wherein the operations further comprise receiving, by the UE from the telecommunication network, a configuration that adjusts the condition.

15. One or more non-transitory computer-readable media storing computer-executable instructions that, when executed by one or more processors of a user equipment (UE), cause the UE to perform operations comprising:
determining one or more factors associated with a status of the UE, wherein the UE supports establishing a dual connection, with a telecommunication network, that includes:
  a Long-Term Evolution (LTE) connection between the UE and an LTE base station of the telecommunication network; and
  a fifth generation (5G) connection between the UE and a 5G base station of the telecommunication network;
establishing the LTE connection with the LTE base station;
determining that the one or more factors meet a condition for using the LTE connection without using the 5G connection;
receiving a 5G measurement request from the telecommunication network; and
based on the determining that the one or more factors meet the condition, suppressing sending a 5G measurement report to the telecommunication network in response to the 5G measurement request,
wherein suppressing sending the 5G measurement report causes the telecommunication network to avoid establishing the 5G connection with the UE.

16. The one or more non-transitory computer-readable media of claim 15, wherein:
the one or more factors includes one or more of display status of a display of the UE or sensor data,
the one or more factors indicates at least one of:
  that the display is turned off, or
  that that a user is not looking at the display, and
the condition is that the display is turned off or that the user is not looking at the display.

17. The one or more non-transitory computer-readable media of claim 15, wherein:
at least one of the one or more factors is an application type or data type associated with the data to be sent or received,
the data to be sent or received is at least one of:
  under a threshold size, or
  associated with a background process, and
the condition is that the data to be sent or received is under the threshold size or is associated with the background process.

18. The one or more non-transitory computer-readable media of claim 15, wherein:
at least one of the one or more factors is a battery level of a battery of the UE,
the battery level indicates that an energy level of energy stored in the battery is below a threshold percentage, and
the condition is that the battery level is below the threshold percentage.

19. The one or more non-transitory computer-readable media of claim 15, further comprising:
establishing the dual connection with the telecommunication network; and
sending, in response to determining that the one or more factors meet the condition, a dual connection disablement message to the telecommunication network, wherein the dual connection disablement message causes the 5G base station to disable the 5G connection.

20. The one or more non-transitory computer-readable media of claim 15, wherein the operations further comprise receiving, by the UE from the telecommunication network, a configuration that adjusts the condition.

* * * * *